Feb. 25, 1947.  R. C. DATIN  2,416,615
PROCESS FOR GRAINING AMMONIUM NITRATE
Filed June 19, 1943
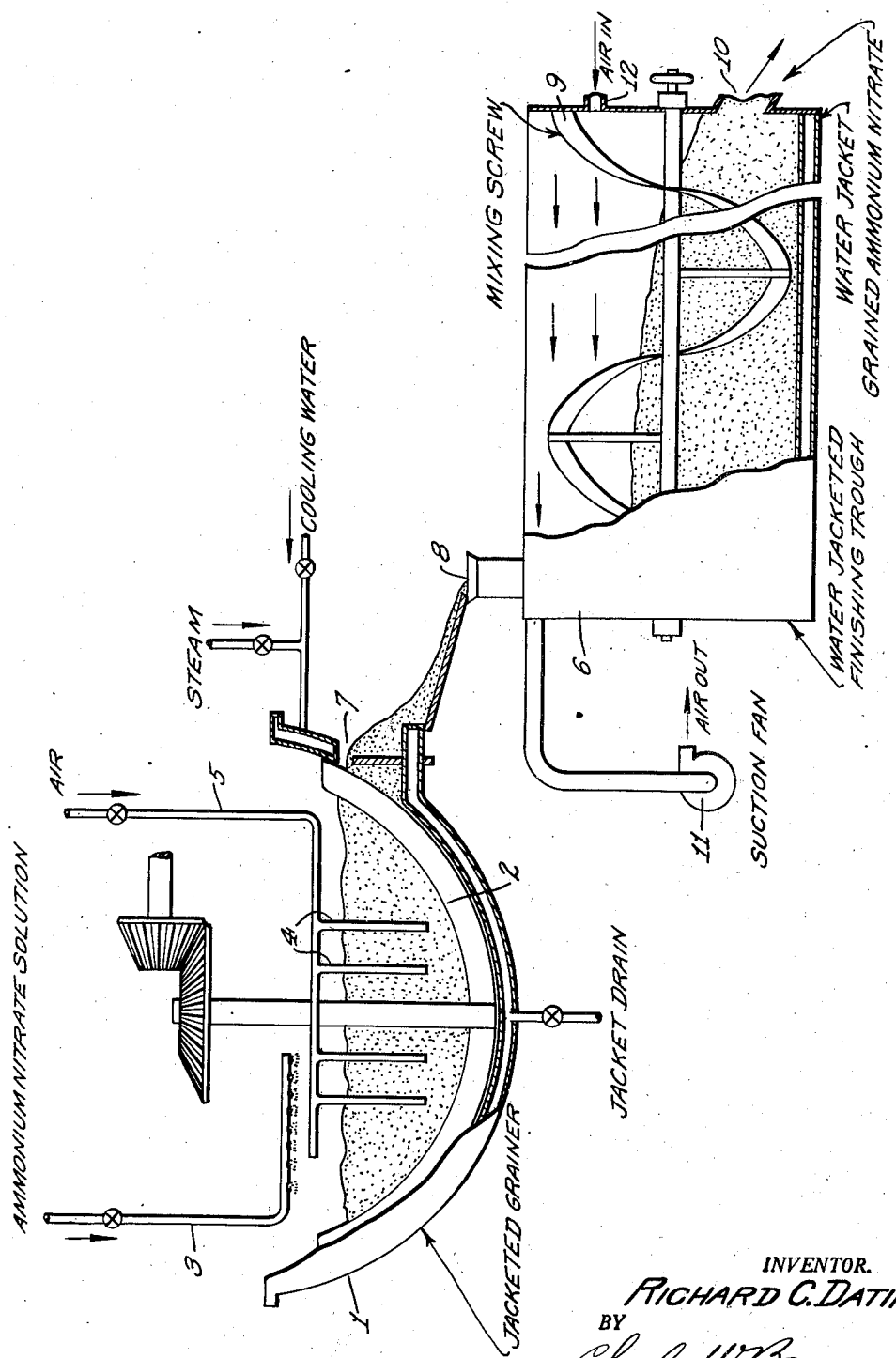
INVENTOR.
RICHARD C. DATIN
BY
Charles W Brown
ATTORNEY Patented Feb. 25, 1947

2,416,615

UNITED STATES PATENT OFFICE 2,416,615

PROCESS FOR GRAINING AMMONIUM NITRATE

Richard C. Datin, Petersburg, Va., assignor to The Solvay Process Company, New York, N. Y., a corporation of New York Application June 19, 1943, Serial No. 491,558

10 Claims. (Cl. 23—103)

This invention relates to the treatment of concentrated solutions of ammonium nitrate to recover ammonium nitrate as a dry solid of desirable particle size.

The recovery of ammonium nitrate from solution by a so-called graining operation has heretofore involved batch operations. The term "graining" refers to the conversion of a solution of ammonium nitrate into granular solid by evaporation of water or cooling or both. The concentrated ammonium nitrate solution containing 1% to 5% water, at a temperature above its salting out temperature, is run into a grainer. The standard grainer is a jacketed pan provided with a moving plow or agitator. After filling the grainer with the solution, cooling water is run through the jacket to cool and crystallize the charge. Water evaporates into the air over the grainer and it is known to increase this evaporation by passing air, which may be heated, through the material being crystallized. The cooling may be interrupted and steam introduced into the jacket to heat the material before again cooling it. The heat thus supplied increases the drying effect. Operation of these grainers has heretofore involved a period of four to six hours for cooling a solution introduced into the grainer at 120° to 160° C. to lower its temperature to 55° to 80° C. and convert it into a dry, granular product.

It is frequently desirable that grained ammonium nitrate have well defined characteristics with respect to its particle size and bulk density. This is particularly true of ammonium nitrate to be used in the manufacture of explosives. For this purpose specifications must be met calling for certain bulk densities and definite limits in the amounts of particles of various sizes as determined by screen analysis.

It is an object of my invention to provide a process for the graining of ammonium nitrate wherein there is a relatively wide flexibility in adjusting conditions to produce a product of desired screen analysis and density. It is an object of this invention to provide a process for graining ammonium nitrate solutions which may be continuously operated with a relatively small quantity of material being processed at a given moment, thus substantially reducing the explosion hazard. Further, it is an object of this invention to materially increase the production rate of an ammonium nitrate graining plant of given size.

I have discovered that large, uniformly-sized grains or crystals of ammonium nitrate are obtained when the graining operation is carried out at temperatures above 125° C. and that smaller crystals, but still of uniform size, are obtained by graining at temperatures below 125° C. Variations in the graining temperature from 90° to 1° or 2° below 125° C., or from 150° to 1° or 2° above 125° C., have little influence on the crystal size. I have further found that the evaporation of moisture from ammonium nitrate into air contacted therewith is greatly affected by the condition of the ammonium nitrate in contact with the air. The drying rate of a moist, solid ammonium nitrate may be five to ten times more rapid than the rate of drying of a slurry or solution of the ammonium nitrate.

The process of this invention utilizes these discoveries with respect to graining ammonium nitrate by mixing a concentrated solution of ammonium nitrate with a mass of crystalline ammonium nitrate which is maintained at temperatures above 125° C. or below 125° C. during the conversion of the concentrated solution into solid, granular ammonium nitrate without permitting the temperature of the solid and solution mixed therewith to pass through 125° C. during the graining operation. Thus, whether the process is to be used to produce a grained ammonium nitrate of relatively large particle size by maintaining temperatures above 125° C., or to produce a material of relatively small particle size by maintaining temperatures below 125° C., this temperature of 125° C. represents a limiting dividing line within the range 90° C. to 150° C. at which the graining process of this invention is carried out. This limiting temperature is not passed during the graining operation. The temperature of the materials being treated is preferably maintained within the range 115° to 135° C. without, however, passing through 125° C. Whether the temperature is maintained above or below 125° C., will depend upon whether a coarse or fine grained product is desired.

Crystallization of ammonium nitrate from the solution depends upon both the temperature maintained during the graining step and the water content of the solution from which the ammonium nitrate is crystallized. The ammonium nitrate is, therefore, caused to crystallize from the solution by evaporating water from the mixture of solution and solid in the graining step. This evaporation of water is best accomplished by passing air in contact with the mass of solid and solution. The air is preferably preheated to 120° to 150° C. to aid in evaporating the water.

The mass of crystalline ammonium nitrate and concentrated solution mixed therewith is maintained as a damp mixture containing substantially 1.5% to 25% by weight of liquid, preferably 5% to 12%. The amount of liquid present will depend upon both the temperature and the water content of the material. For example, 1.5% liquid phase corresponds to 0.15% $H_2O$ at 90° C. and to 0.03% $H_2O$ at 150° C. 25% liquid phase corresponds to 2.8% $H_2O$ at 90° C. and to 0.4% $H_2O$ at 150° C. For temperatures of 124° C. and 126° C. a moisture content of 0.05% corresponds to 1.5% liquid phase and a moisture content of 1.1% corresponds to 25% liquid phase present in the mass of ammonium nitrate crystals in which the graining takes place.

The desired damp character of the mass of ammonium nitrate crystals is maintained, therefore, by properly correlating the temperature and water content of the mass so that it contains at least 0.15% $H_2O$ at a temperature of 90° C., with this permissible lower limit decreasing to 0.03% $H_2O$ for a temperature of 150° C. and so that it contains no more than 2.8% $H_2O$ for a temperature of 90° C. with this upper limit of moisture content progressively decreasing to 1.1% $H_2O$ for temperatures of 124° C. and 126° C. and to 0.4% $H_2O$ for a temperature of 150° C. For maintaining the preferred 5% to 12% liquid phase present, the moisture content is maintained at at least 0.6% $H_2O$ for 90° C., with this minimum moisture content decreasing to 0.1% $H_2O$ for a temperature of 150° C., and at no more than 1.3% $H_2O$ for a temperature of 90° C., with this maximum moisture content decreasing to 0.5% $H_2O$ for temperatures of 124° C. and 126° C. and to 0.2% $H_2O$ for a temperature of 150° C. For both the preferred temperature range of 115° C. to 135° C. and preferred 5% to 12% of liquid phase, the minimum moisture content is from 0.3% $H_2O$ for a temperature of 115° C. to 0.1% $H_2O$ for a temperature of 135° C., and the maximum moisture content is from 0.7% $H_2O$ for a temperature of 115° C. to 0.3% $H_2O$ for a temperature of 135° C.

The correlation of moisture content and temperature of the mass of crystalline ammonium nitrate in which the graining of the solution takes place may be accomplished by suitable control of the rate of feeding the concentrated solution of ammonium nitrate to the mass of crystals, the rate of evaporating water into the air contacted with the mass of material by controlling the quantity and temperature of the air, and by suitably controlling the rate of heating or cooling the mass of crystals to which the solution is added.

An important advantage of the process of this application is that it permits producing a grained ammonium nitrate of desired crystal size, either large or small crystals, independently of the degree to which a solution of ammonium nitrate is concentrated before it is grained. This is a particularly desirable feature of this invention when it is desired to produce a product of large crystal size by graining at temperatures above 125° C. Ammonium nitrate melts crystallizing at temperatures above 125° C. contain about 4% or less water and about 96% or more ammonium nitrate. Such a solution boils at about 180° C. Even though the evaporation is carried out under reduced pressures to permit using lower temperatures, in order to avoid difficulties due to solidification of the liquor in the evaporator it is desirable to maintain the evaporating liquor at temperatures substantially above, e. g. 20° C. or more, above its solidification temperature. This means that in concentrating an ammonium nitrate solution to above 96% $NH_4NO_3$ and less than 4% water, temperatures of 160° C. to 190° C. are desirable from the view point of driving out the water and avoiding danger of solidification in the evaporator. These high temperatures, however, are approaching the temperature at which ammonium nitrate rapidly decomposes. They present a real danger of explosion of the ammonium nitrate, particularly if a foreign material such as dust should get into the liquor or if slightly higher temperatures should be accidentally attained in any part of the evaporator.

By the process of this invention an ammonium nitrate of desired crystal size whether large or small crystals may be produced from solutions containing no more than 96% ammonium nitrate. Such solutions may be prepared without employing the high temperatures required for evaporating ammonium nitrate solutions to higher concentrations. On the other hand, if a 96% solution of ammonium nitrate is cooled to crystallize out the salt, practically all deposits in the form of fine crystals at temperatures below 125° C. Employing the process of this invention, by maintaining a mass of crystalline ammonium nitrate and concentrated solution at temperatures above 125° C., adding thereto ammonium nitrate solution of a concentration no greater than 96% and evaporating water from the hot mixture to cause crystallization of ammonium nitrate from the solution, the crystallization temperature is maintained above 125° C. and a product in the form of relatively large crystals is deposited from the solution. By this mode of operation large crystal product may be recovered from solution containing no more than 96% ammonium nitrate which may be prepared at relatively low evaporation temperatures.

Although the process of this invention is thus particularly advantageous when used to recover a large-sized crystal product from solutions containing no more than 96% ammonium nitrate, the invention is not limited to the treatment of such solutions or to the production of a large-sized product therefrom. The concentration of the solution of ammonium nitrate introduced to the agitated mass of crystalline ammonium nitrate may range from for example, 80% to 99% $NH_4NO_3$ with the remainder water, although it is preferably about 95% $NH_4NO_3$ and 5% water.

The ordinary jacketed grainers heretofore employed in graining ammonium nitrate may be used for carrying out the graining process of this invention. The preferred mode of operation of such a grainer is to continuously, slowly feed the ammonium nitrate solution into a mass of damp ammonium nitrate crystals maintained at the desired temperature by suitable rate of supply of steam or cooling water to the grainer jacket. The air to facilitate evaporation of moisture may be introduced through a manifold with outlets extending into the mass of material. In treating a solution fed to the graining step at a given temperature to produce a product containing a given residual moisture content, the supply of heat to or withdrawal from the material depends upon the temperature of the operation and the concentration of the ammonium nitrate solution being supplied. For example, when graining at 135° C. a solution of 95% ammonium nitrate and 5% water supplied at 145° C. to make a product containing 0.2% residual moisture, about 12 B. t. u. of heat per pound of ammonium nitrate must be supplied to maintain the desired temperature of operation. On the other hand, when graining at 115° C. with the same feed solution, about 25 B. t. u. of heat per pound of ammonium nitrate must be withdrawn. These heat requirements of the graining process are principally met by introducing steam or cooling water to the jacket of the grainer. The amount of heating or cooling by the steam or cooling water thus used will also, of course, vary according to whether heat is also supplied or removed by preheating the air to above the graining temperature or by using air below that temperature.

The best results are obtained and it is much preferred to maintain the mass of moist solid ammonium nitrate into which the feed solution is introduced at substantially a constant temperature above or below 125° C. It is also generally desirable to remove continuously hot, damp ammonium nitrate from the grainer to compensate for that produced from the ammonium nitrate solution fed thereto. The material thus removed from the grainer is then treated by a separate finishing step to dry it, if desired, and to cool it to a temperature of about 80° C. or lower at which it will not cake when transferred to storage. However, the removal of product from the grainer may be intermittent without seriously affecting the effectiveness of my process for the production of an ammonium nitrate product of particles of desired size and to do this much more economically than by the graining processes heretofore known to the art.

The economic advantage and the materially lessened explosion hazard of my continuously operating process as compared with the batch processes heretofore available is emphasized by the following comparison. In order to grain a 98–99% solution of ammonium nitrate in the standard type grainers into which a charge of the solution is filled and is cooled from 150° C. to 50° C. to convert it into a solid, at least six standard grainers 6 feet in diameter are required to produce 8000 tons per year of the solid ammonium nitrate. The operation of these grainers involves having in process at all times 3 to 6 tons of ammonium nitrate. The presence of this large quantity of ammonium nitrate in process presents a real hazard due to the tendency of the salt to explode. A graining installation of the same 8000 tons per year capacity operating in accordance with the process of this invention requires one standard grainer unit and that need only operate at about half capacity. Only 1000 pounds of ammonium nitrate need be in process at a given moment; one-sixth to one-twelfth the amount present in operating the prior art processes.

The following examples further illustrate the process of this invention. The procedures of these examples may be carried out in a standard jacketed graining pan provided with suitable means for passing air through the solid material being treated in the graining pan and for continuously supplying the ammonium nitrate solution, preferably in the form of spray to the surface of the solid in the pan. Such an apparatus, including the auxiliary equipment for cooling and drying the grained ammonium nitrate, is shown in the accompanying drawing.

The apparatus of the drawing includes a jacketed graining pan 1 provided with inlets to the interior of the jacket for steam and cooling water. A rotatable plow 2 serves for agitating the mass of material in the graining pan. A pipe 3, with a lower horizontal portion perforated along its bottom side, provides a means for spraying the ammonium nitrate solution onto the contents of the graining pan. A plurality of pipes 4 opening at their bottom ends within the material in graining pan 1 and communicating with an air inlet pipe 5, serve for passing air into and through the mass of material being treated in the graining pan.

A water-jacketed finishing trough 6 is provided for cooling and drying the grained ammonium nitrate leaving the graining pan through its port 7 and introduced into the finishing trough through an inlet 8. Trough 6 is provided with a rotatable mixing screw 9 which serves to agitate the solids introduced into the finishing trough and to advance the material from the inlet end to the outlet end of the trough containing a port 10 from which the treated material escapes. A suction fan 11 serves to draw air through a port 12 into and through the finishing trough where it is contacted with the solid being treated therein.

*Example 1.*—340 pounds per hour of a 95% ammonium nitrate solution at 145° C. is continuously fed through spray pipe 3 of the apparatus shown in the accompanying drawing into an agitated mass of solid ammonium nitrate granules containing 0.3% $H_2O$ held at 131° C. in a jacketed grainer 1. Steam at 30 pounds gauge pressure was introduced into the jacket to maintain the temperature of the material constant at substantially 131° C. About 21 cubic feet per minute of air preheated to 138° C. was forced through the moist mass of solid from air inlets 4 within the mass. Grained product was continuously removed from the grainer at a rate such as to retain in the grainer about 126 pounds of ammonium nitrate granules as grained product was produced from the solution continuously fed thereto. The product removed from the grainer through outlet port 7 was subjected to a finishing operation in trough 6 in which it was cooled from 131° to below 85° C. and dried to about 0.1% moisture by contact with air while the product was being agitated to prevent the granules sticking and to give a free-flowing granular material. Screen analysis of the product showed about 1% retained on 10 mesh and 85% retained on 35 mesh screens. (All screen analyses given herein are cumulative Tyler Screen sizes.)

*Example 2.*—The above process of Example 1 was modified to feed the concentrated ammonium nitrate solution at 145° C. into a mass of granules in the grainer maintained at 116° C. and 0.4% $H_2O$ by cooling water in the jacket of the grainer while air at 120° C. was forced through the mass of material at the rate of 10.5 cubic feet per minute. About 168 pounds of material were continuously held in the grainer and hot, damp product of the graining operation was cooled to below 85° C. and dried by contact with air. Under these conditions of operation the product had a screen analysis of about 6% on 35 mesh and 94% on 100 mesh; i. e., about 88% had particle size within the range 35 to 100 mesh, whereas the material grained at the higher temperature maintained in Example 1 contained 84% within the range 10 to 35 mesh particles.

*Example 3.*—A 95% ammonium nitrate solution at 147° C. was fed into 100 pounds of grained ammonium nitrate in a grainer at the rate of about 520 pounds per hour. The grained ammonium nitrate was permitted to accumulate in the grainer during a period of 15 minutes during which it was held at a temperature of 115° C. and about 0.8% moisture by suitable correlation of the cooling effect of water introduced into the jacket of the grainer and of the rate and temperature of passing air through the material. The hot, damp, grained material discharged from the grainer at the end of 15 minutes was cooled to below 85° C. and dried to about 0.1% residual moisture by contact with air while being agitated. The final product had a mesh size of 3% on 35 mesh and 65% on 100 mesh. It contained 62% of particles within the range 35 to 100 mesh. Thus, this product, produced by a process which primarily differed from the process of Example 2 in the rate of feed of the ammonium nitrate solution to the mass of ammonium nitrate granules, contained somewhat less material within the range 35 to 100 mesh and substantially more fines 100 mesh size and smaller than the material produced by the graining operation of Example 2.

The graining operation of this invention performs two functions. First, it crystallizes the ammonium nitrate, with the particular advantage that it provides a method for controlling the particle size of the crystallized material. Secondly, the bulk of the water present in the solution fed to the graining step is evaporated simultaneously with the graining. The ammonium nitrate produced by my graining operation is satisfactory for many purposes after being cooled with agitation to prevent the granules sticking together. For other purposes, however, it is desirable to subject the grained material to a finishing operation which has as its functions one or both of the following in addition to cooling the product to a temperature low enough to prevent its caking: (1) to remove most of the residual water left in the grained material, and (2) rounding the individual crystals to increase the density and free-flowing qualities of the product. The residual water may be removed to give a product with less than 0.1% residual moisture, by treating the grained material with heated or unheated air in a rotary drier, a trough drier with screw agitator, or in a standard graining pan with plows or agitators to mix the material while it is being treated with the air. By tumbling the crystals for a sufficiently long time during or after the drying, they will be polished or rounded and the bulk density of the product increased.

As pointed out above, the product of the graining process of this invention, whether in the form of relatively large or small particles, is quite uniform in particle size. Particularly for the manufacture of explosives specifications frequently require the product have a substantial quantity of fines; i. e., material of 100 mesh or smaller, and the products of the graining and finishing operations heretofore described may not meet some such specifications. I have discovered a method for treating grained ammonium nitrate to modify its screen analysis so that it contains more fines without unduly modifying the crystal size of the bulk of the material. Thus, a product may be made meeting certain specifications with respect both to the quantity of fines contained therein and the distribution as to grain size of the larger particles of the material. This procedure is particularly suitable for the treatment of the uniformly grained product of my graining process but it is not limited thereto. Ammonium nitrate grained by other procedures yielding a product containing a smaller proportion of fines than is desired may be subjected to this treatment to produce a controlled quantity of fines.

My procedure for producing an increased quantity of fines in grained ammonium nitrate is, in substance a shock cooling of the ammonium nitrate to cause shattering of some of the crystals. I have discovered that by rapidly cooling grained ammonium nitrate from temperatures above 110° C. to 85° C. or below in contact with a solid, cold surface through which a substantial amount of the heat removed in thus cooling the ammonium nitrate is transferred, it is possible to convert a substantial proportion of the particles of the grained ammonium nitrate larger than 100 mesh into fines of a particle size such that they pass through a 100 mesh screen. This rapid cooling involves lowering the temperature of the grained ammonium nitrate from above 110° C. to below 85° C. at a rate of at least 0.5° C. fall in temperature per minute, preferably from 0.5° to 2° C. per minute.

The desired increase in fines in a grained ammonium nitrate may be accomplished by introducing hot, grained ammonium nitrate into a graining pan through the jacket of which cooling water is circulated. The cooling by the water-cooled surfaces of the pan may be supplemented, if desired, by passing cool air in contact with the material. Similar results are obtained by feeding the hot, grained material into the water-cooled graining pan containing previously cooled, grained ammonium nitrate. The material is agitated in the pan and is rapidly cooled by the cool pan surfaces. Material thus cooled to 85° C. or lower may be removed from the pan at a rate compensating for the rate of addition of the hot material fed to the pan.

The treatment of the grained ammonium nitrate to increase the amount of fines contained therein may be done simultaneously with agitation sufficiently prolonged to accomplish the desired rounding or polishing of the grains and with treatment of the material with air to remove residual water from the feed of grained ammonium nitrate.

The following examples are further illustrative of my process for graining ammonium nitrate solutions and of modifying the particle size of the grained nitrate by my finishing process:

*Example 4.*—A 95% ammonium nitrate solution at 155° C. is continuously fed onto a tumbling mass of ammonium nitrate granules containing 0.5% $H_2O$ maintained at 132° C. in a jacketed grainer by means of steam introduced into the jacket. The ammonium nitrate solution is introduced into the grainer at the rate of about 360 pounds per hour. Simultaneously, about 16 cubic feet per minute of air at 133° C. is passed through the material in the grainer to evaporate water introduced with the solution. Grained ammonium nitrate is continuously removed from the grainer to hold the fillage of the latter constant at about 160 pounds.

Under these conditions of operation samples of grained product leaving the grainer, after being dried and cooled, show a bulk density of 1.20 grams/cc. and a screen analysis of 5% on 10 mesh, 80% on 35 mesh and 99% on 100 mesh.

The grained ammonium nitrate as it leaves the grainer at 132° C. with a moisture content of 0.5% $H_2O$ is continuously fed at a rate of about 340 pounds per hour to a jacketed, metal finishing trough provided with a helicoid screw for mixing and advancing the material through the trough. Cooling water at 22° C. is passed through the jacket of the trough. Finished product is continuously discharged from the trough to hold a constant fillage of 260 pounds and a processing time of about 48 minutes. Air introduced at 31° C. at the rate of 220 cubic feet per minute is passed in countercurrent flow in contact with the material advancing through the trough. The material leaves the trough at 76° C. with a moisture content of 0.074%. About half the heat removed from the grained material in cooling it to 76° C. is transferred to the cooling water through the metal trough and the other half is taken up by the air and moisture evaporated into the air. The product leaving the finishing step has a bulk density of 1.25 grams/cc. and a screen analysis of 5% on 10 mesh, 54.5% on 35 mesh, 77.9% on 100 mesh and 22.1% fines smaller than 100 mesh.

Example 5.—A coarse-grained ammonium nitrate at 130° C., having a moisture content of 0.45%, is fed to a water-cooled kettle or pan provided with a plow agitator. The grained ammonium nitrate is fed at the rate of 200 pounds per hour and finished product is continuously removed from the kettle or pan to maintain constant fillage of 198 pounds and a processing time of about one hour. Air at 35° C. is blown through the agitated mass to dry it to a moisture content of 0.05%. The cooling effect of the water in the kettle jacket, supplemented by that of the air, is adequate to cool the material in the kettle to a temperature of 83° C. About half the heat abstracted from the ammonium nitrate is transferred through the water-cooled kettle or pan and the other half taken up by the air and moisture evaporated. The bulk density of a product thus made was 1.25 grams/cc. and it had a screen analysis of 8.6% on 10 mesh, 63.3% on 35 mesh and 80.7% on 100 mesh. The bulk density of the grained ammonium nitrate before this treatment was 1.17 grams/cc. and its screen analysis was 5.9% on 10 mesh, 73.7% on 35 mesh and 99.7% on 100 mesh. In this example a grained ammonium nitrate containing 0.3% fines smaller than 100 mesh was converted into a product of which 19.3% was fines smaller than 100 mesh and of greater density than the original material.

Example 6.—157 pounds of coarse-grained ammonium nitrate at 131° C. containing 0.47% moisture is introduced into a jacketed finishing kettle. The batch is tumbled in the kettle by means of a rotating plow therein for 32 minutes. During this period the material is cooled to a temperature of 80° C. by introducing water into the cooling jacket of the kettle and passing air at 36° C. in contact with the ammonium nitrate to aid in cooling it and to dry it. About equal amounts of the heat removed in cooling the ammonium nitrate were transferred to the cooling water and to the air. Product thus made had a moisture content of 0.05% and density of 1.30 grams/cc. Its screen analysis showed 0.4% on 10 mesh, 56.1% on 35 mesh and 74% on 100 mesh. Before this finishing treatment the grained ammonium nitrate had a density of 1.10 grams/cc. and screen analysis of 1.40% on 10 mesh, 46.9% on 35 mesh and 92.7% on 100 mesh. A grained ammonium nitrate containing 7.3% fines smaller than 100 mesh was converted into a product of increased density containing 26% fines smaller than 100 mesh by the procedure of this example.

Example 7.—A coarse-grained ammonium nitrate at 135° C. and containing 0.25% moisture is continuously fed at the rate of 300 pounds per hour to the metal finishing trough used in carrying out the process of Example 4. The treated product is continuously discharged to maintain a fillage of 210 pounds and a processing time of about 40 minutes. Air at an initial temperature of 32° C. is passed in countercurrent flow with the material in the trough. Water at an initial temperature of 19° C. is passed through the trough jacket to cool the ammonium nitrate to a temperature of 79° C. as it leaves the trough. Product thus made had a moisture content of .05% and a bulk density of 1.25. Its screen analysis showed 2% on 10 mesh, 70% on 35 mesh and 89.7% on 100 mesh with 10.3% finer than 100 mesh. Before this finishing treatment the grained ammonium nitrate had a density of 1.20 grams/cc. and screen analysis of 4.3% on 10 mesh, 82.4% on 35 mesh and 99.5% on 100 mesh. A material containing 0.5% fines was thus converted by the finishing treatment into a product of greater density containing 10.3% fines.

The amount of fines smaller than 100 mesh produced by the finishing treatment described above may be varied by varying the proportion of cooling provided by the cool metal surfaces and the air. A maximum amount of fines is produced when all the cooling is accomplished by heat transfer through the metal cooling surfaces. As the amount of heat taken up by air passed in contact with the hot, grained ammonium nitrate increases, the amount of fines produced decreases. It is preferred to provide about half or more of the required cooling effect by heat transfer through the cool metal surfaces since this gives a very desirable increase in fines.

I claim:

1. The process for graining ammonium nitrate which comprises mixing a concentrated aqueous solution of the same with a damp mass of crystalline ammonium nitrate maintained at temperatures within one of the ranges 90° C. to 124° C. and 126° C. to 150° C. during the graining of the ammonium nitrate, and evaporating from said mass water contained in the solution introduced thereinto, whereby the ammonium nitrate contained in said concentrated solution is converted into a granular solid, the rate of addition of water in the solution and the rate of evaporation being correlated so as to maintain in the mass of crystalline ammonium nitrate an amount of water so correlated with its temperature that at 90° C. said mass contains at least 0.15% $H_2O$ with this minimum limit decreasing to 0.03% $H_2O$ for a temperature of 150° C., and for a temperature of 90° C. contains no more than 2.8% $H_2O$ with this maximum limit decreasing to no more than 1.1% $H_2O$ for temperatures of 124° C. and 126° C. and to no more than 0.4% $H_2O$ for a temperature of 150° C.

2. The process for graining ammonium nitrate which comprises mixing a concentrated aqueous solution of the same with a damp mass of crystalline ammonium nitrate maintained at temperatures within one of the ranges 115° C. to 124° C. and 126° C. to 135° C. during the graining of the ammonium nitrate, and evaporating water contained in said solution into air in contact with the mass of crystalline ammonium nitrate with which the solution is mixed, whereby the ammonium nitrate contained in said concentrated solution is converted into a granular solid, the rate of addition of water in the solution and the rate of evaporation being correlated so as to maintain in the mass of crystalline ammonium nitrate an amount of water so correlated with the temperature that at 115° C. said mass contains at least 0.3% $H_2O$ with this lower limit in the amount of water decreasing to 0.1% $H_2O$ for a temperature of 135° C., and for a temperature of 115° C. contains no more than 0.7% $H_2O$ with this maximum amount of water decreasing to 0.3% $H_2O$ for a temperature of 135° C.

3. The process for graining ammonium nitrate which comprises continuously introducing a concentrated aqueous solution of ammonium nitrate into a damp mass of crystalline ammonium nitrate and mixing the solution therewith while maintaining the mass at temperatures within one of the ranges 90° C. to 124° C. and 126° C. to 150° C., simultaneously with the mixing of said solution and damp mass of crystalline ammonium nitrate, passing preheated air through and in intimate contact with the damp mass to evaporate into the air water contained in the concentrated aqueous solution, thereby converting the ammonium nitrate contained in said concentrated solution into a granular solid, the rate of addition of water in the solution and the rate of evaporation being correlated so as to maintain in the mass of crystalline ammonium nitrate an amount of residual unevaporated water so correlated with the temperature at which the mass is maintained that at 90° C. said mass contains at least 0.15% $H_2O$ with this minimum limit decreasing to 0.03% $H_2O$ for a temperature of 150° C., and for a temperature of 90° C. contains no more than 2.8% $H_2O$ with this maximum limit decreasing to no more than 1.1% $H_2O$ for temperatures of 124° C. and 126° C. and to no more than 0.4% $H_2O$ for a temperature of 150° C., and withdrawing thus grained ammonium nitrate from said mass in amount corresponding to the ammonium nitrate introduced in said aqueous solution.

4. The process for graining ammonium nitrate which comprises continuously introducing a concentrated aqueous solution of ammonium nitrate into a damp mass of crystalline ammonium nitrate and mixing the solution therewith while maintaining the mass at a substantially constant temperature within one of the ranges 90° to 124° C. and 126° to 150° C., simultaneously with the mixing of said solution and damp mass of crystalline ammonium nitrate, passing preheated air through and in intimate contact with the damp mass to evaporate into the air water contained in the concentrated aqueous solution, thereby converting the ammonium nitrate contained in said concentrated solution into a granular solid, the rate of addition of water in the solution and the rate of evaporation being correlated so as to maintain in the mass of crystalline ammonium nitrate an amount of residual unevaporated water so correlated with the temperature at which the mass is maintained that at 90° C. said mass contains at least 0.6% $H_2O$ with this lower limit in the amount of water decreasing to 0.3% $H_2O$ for a temperature of 115° C. and to 0.1% $H_2O$ for temperatures of 135° C. to 150° C., and for a temperature of 90° C. contains no more than 1.3% $H_2O$ with this maximum amount of water decreasing to 0.7% $H_2O$ for a temperature of 115° C., to 0.5% $H_2O$ for temperatures of 124° C. and 126° C. to 0.3% $H_2O$ for a temperature of 135° C. and to 0.2% $H_2O$ for a temperature of 150° C., and withdrawing thus grained ammonium nitrate from said mass in amount corresponding to the ammonium nitrate introduced in said aqueous solution.

5. The process for graining ammonium nitrate to produce a product of large crystal size which comprises mixing a concentrated aqueous solution of ammonium nitrate containing no more than 96% $NH_4NO_3$ and at least 4% water with a damp mass of crystalline ammonium nitrate maintained at a temperature above 125° C., and evaporating water contained in said solution into air in contact with a mass of crystalline ammonium nitrate with which the solution is mixed, the rate of addition of water in the solution and the rate of evaporation being correlated so as to maintain in said mass an amount of water so correlated with its temperature that at 126° C. said mass contains at least 0.05% $H_2O$ with this minimum limit decreasing to 0.03% $H_2O$ for a temperature of 150° C., and for a temperature of 126° C. contains no more than 1.1% $H_2O$ with this maximum limit decreasing to no more than 0.4% $H_2O$ for a temperature of 150° C., whereby the ammonium nitrate contained in said concentrated solution is converted into a granular solid of large crystal size.

6. The process for producing a grained ammonium nitrate from a concentrated solution of the same which comprises mixing said concentrated solution with a damp mass of crystalline ammonium nitrate maintained at temperatures within one of the ranges 115° C. to 124° C. and 126° C. to 135° C. during the graining of the ammonium nitrate, evaporating water contained in said solution into air in contact with the mass of crystalline ammonium nitrate, whereby the ammonium nitrate contained in said concentrated solution is converted into a granular solid, the rate of addition of water in the solution and the rate of evaporation being correlated so as to maintain in the mass of damp crystalline ammonium nitrate an amount of water so correlated with the temperature of the damp mass that at 115° C. said mass contains at least 0.3% with this lower limit in the amount of water decreasing to 0.1% $H_2O$ for a temperature of 135° C., and for a temperature of 115° C. contains no more than 0.7% $H_2O$ with this maximum amount of water decreasing to 0.3% $H_2O$ for a temperature of 135° C., withdrawing from said mass hot, damp, grained ammonium nitrate at a temperature within the range 115° to 135° C. and cooling the thus withdrawn material by contact with cold, solid heat transfer surfaces while agitating the material and cooling the hot grained ammonium nitrate to a temperature not above 85° C. at a rate of at least 0.5° C. fall in temperature per minute with a substantial amount of the heat abstracted in thus cooling the ammonium nitrate being removed through said cooling surfaces.

7. The process for producing grained ammonium nitrate from a concentrated solution of the same which comprises continuously introducing a concentrated aqueous solution of ammonium nitrate into a damp mass of crystalline ammonium nitrate and mixing the solution therewith while maintaining the mass at a substantially constant temperature within one of the ranges 90° to 124° C. and 126° to 150° C., evaporating water contained in said solution into air in contact with the mass of crystalline ammonium nitrate with which the solution is mixed, whereby the ammonium nitrate contained in said concentrated solution is converted into a granular solid, the rate of addition of water in the solution and the rate of evaporation being correlated so as to maintain in the mass of crystalline ammonium nitrate an amount of water so correlated with the temperature of the damp mass that at 90° C. said mass contains at least 0.15% $H_2O$ with this minimum limit decreasing to 0.03% $H_2O$ for a temperature of 150° C., and for a temperature of 90° C. contains no more than 2.8% $H_2O$ with this maximum limit decreasing to no more than 1.1% $H_2O$ for temperatures of 124° and 126° C. and to no more than 0.4% $H_2O$ for a temperature of 150° C., continuously withdrawing hot, damp ammonium nitrate from the aforesaid mass of crystalline ammonium nitrate, agitating the thus withdrawn material while passing air therethrough to evaporate water therefrom and while cooling the agitated material by contact with cold, metal heat transfer surfaces maintained at a temperature at which the hot grained ammonium nitrate is cooled to not above 85° C at a rate of 0.5° to 2.0° C. fall in temperature per minute by transfer of heat from the hot grained ammonium nitrate through said metal surfaces supplemented by the cooling effect of the air and evaporation of water thereinto.

8. The process for finishing grained ammonium nitrate to increase the quantity of fines therein which comprises agitating a mass of hot grained ammonium nitrate initially at a temperature above 110° C. while the mass of agitated grained solid is in contact with cold, solid heat transfer surfaces, and cooling said hot grained ammonium nitrate from above 110° C. to not above 85° C. at a rate of at least 0.5° C. fall in temperature per minute with a substantial amount of the heat abstracted from the hot grained ammonium nitrate in thus cooling it being removed through said cooling surfaces.

9. The process for finishing grained ammonium nitrate to increase the quantity of fines therein which comprises agitating a mass of hot grained ammonium nitrate initially at a temperature above 110° C. while the mass of agitated grained solid is in contact with cold, metal surfaces, and cooling said hot grained ammonium nitrate from above 110° C. to not above 85° C. at a rate of 0.5° to 2.0° C. fall in temperature per minute, with at least half the heat abstracted from the hot grained ammonium nitrate in thus cooling it being removed through said cooling surfaces.

10. The process for finishing grained ammonium nitrate to increase the quantity of fines therein which comprises agitating a mass of grained ammonium nitrate and repeatedly bringing the agitated material into contact with cold metal surfaces, continuously introducing into the mass of thus agitated material hot grained ammonium nitrate initially at a temperature above 110° C., cooling said agitated mass at a rate so correlated with the rate at which the hot grained ammonium nitrate is introduced into the agitated mass that said mass is maintained at a temperature not above 85° C. and the entering hot grained ammonium nitrate is cooled to a temperature not above 85° C. with 0.5° to 2.0° C. fall in temperature per minute, said cold metal surfaces removing a substantial part of the heat contained in the hot grained ammonium nitrate.

RICHARD C. DATIN.

REFERENCES CITED

The following references are of record in the file of this patent:

UNITED STATES PATENTS

| Number | Name | Date |
| --- | --- | --- |
| 1,661,203 | Toniolo | Mar. 6, 1928 |
| 1,721,798 | Toniolo | July 23, 1929 |
| 1,131,361 | Gallup | Mar. 9, 1915 |

FOREIGN PATENTS

| Number | Country | Date |
| --- | --- | --- |
| 301,496 | British | Oct. 17, 1929 |